(12) United States Patent
Fadili et al.

(10) Patent No.: US 9,729,825 B2
(45) Date of Patent: Aug. 8, 2017

(54) METHOD FOR GENERATING AN IMMERSIVE VIDEO OF A PLURALITY OF PERSONS

(71) Applicant: Alcatel Lucent, Boulogne Billancourt (FR)

(72) Inventors: Moulay Fadili, Colombes (FR); Rabih Abou-Chakra, Colombes (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/903,638

(22) PCT Filed: Jun. 20, 2014

(86) PCT No.: PCT/EP2014/063051
§ 371 (c)(1),
(2) Date: Jan. 8, 2016

(87) PCT Pub. No.: WO2015/003889
PCT Pub. Date: Jan. 15, 2015

(65) Prior Publication Data
US 2016/0150187 A1    May 26, 2016

(30) Foreign Application Priority Data

Jul. 9, 2013    (EP) .................................... 13305978

(51) Int. Cl.
*H04N 7/15*    (2006.01)
*H04N 7/14*    (2006.01)

(52) U.S. Cl.
CPC ............... *H04N 7/15* (2013.01); *H04N 7/147* (2013.01); *H04N 7/157* (2013.01)

(58) Field of Classification Search
CPC ........................................................ H04N 7/15
(Continued)

(56) References Cited

U.S. PATENT DOCUMENTS

| 5,850,352 A * | 12/1998 | Moezzi | H04N 5/222 345/419 |
| 6,301,370 B1 * | 10/2001 | Steffens | G06K 9/00228 342/90 |

(Continued)

FOREIGN PATENT DOCUMENTS

JP    2008 306264 A    12/2008

OTHER PUBLICATIONS

International Search Report for PCT/EP2014/063051 dated Sep. 12, 2014.

*Primary Examiner* — Gerald Gauthier
(74) *Attorney, Agent, or Firm* — Fay Sharpe, LLP

(57) ABSTRACT

A method for generating an immersive video of a plurality of persons in a computer server, the method comprising: —receiving a plurality of video streams on a plurality of video channels from a plurality of client devices, each video stream including a silhouette of a person; —extracting the person's silhouette from each incoming video stream to generate a filtered video stream representing only the silhouette of the person; —generating a video stream of a virtual scene comprising a plurality of—the silhouettes extracted from the plurality of filtered video streams the method further comprising receiving silhouette data carried on a metadata channel from a client device in addition to the video stream, the silhouette data representing a position of a face of the person within a frame of the video stream; —analyzing the silhouette data performing the silhouette extraction as a function of the silhouette data analyzed.

15 Claims, 3 Drawing Sheets

(58) Field of Classification Search
USPC ..... 345/419; 348/14.01, 14.02, 14.03, 14.07,
348/14.08, 14.09, 14.1, 14.12, 239, 571,
348/14.13, 152, 222.1; 370/261; 381/92;
463/17; 704/270; 705/3; 709/204;
715/719; 382/103, 115, 118, 190, 218;
396/18; 707/706

See application file for complete search history.

(56) References Cited

U.S. PATENT DOCUMENTS

| | | | | |
|---|---|---|---|---|
| 6,753,857 | B1* | 6/2004 | Matsuura | G06F 3/011 345/419 |
| 7,711,155 | B1* | 5/2010 | Sharma | G06K 9/00288 345/419 |
| 8,269,834 | B2* | 9/2012 | Albertson | G08B 13/19613 340/506 |
| 8,345,114 | B2* | 1/2013 | Ciuc | G06K 9/00221 348/222.1 |
| 8,488,023 | B2* | 7/2013 | Bacivarov | G06K 9/00281 348/239 |
| 8,494,286 | B2* | 7/2013 | Capata | G06K 9/00228 382/103 |
| 8,629,895 | B2* | 1/2014 | Lee | G06F 9/543 175/25 |
| 8,649,604 | B2* | 2/2014 | Steinberg | G06K 9/00228 382/118 |
| 8,750,574 | B2* | 6/2014 | Ganong | G06F 17/30247 382/115 |
| 8,750,578 | B2* | 6/2014 | Neghina | H04N 5/232 348/207.99 |
| 8,761,448 | B1* | 6/2014 | Burr | G06F 3/0304 348/135 |
| 8,831,416 | B2* | 9/2014 | Braithwaite | H04N 5/23219 348/345 |
| 9,015,139 | B2* | 4/2015 | Wong | G06F 17/30831 707/706 |
| 9,129,381 | B2* | 9/2015 | Steinberg | G06T 7/0081 |
| 9,190,061 | B1* | 11/2015 | Shemer | G10L 25/78 |
| 9,237,307 | B1* | 1/2016 | Vendrow | H04N 7/152 |
| 9,251,402 | B2* | 2/2016 | Sun | G06K 9/00281 |
| 9,400,921 | B2* | 7/2016 | Bouguet | G06K 9/00228 |
| 9,482,732 | B2* | 11/2016 | Chesneau | G01R 33/4824 |
| 9,483,997 | B2* | 11/2016 | Candelore | H04W 4/023 |
| 9,501,498 | B2* | 11/2016 | Dhuse | G06F 17/30268 |
| 2006/0200518 | A1* | 9/2006 | Sinclair | H04N 7/142 709/204 |
| 2006/0268101 | A1* | 11/2006 | He | H04N 7/147 348/14.12 |
| 2008/0043644 | A1* | 2/2008 | Barkley | H04Q 11/00 370/261 |
| 2008/0088698 | A1* | 4/2008 | Patel | H04N 7/15 348/14.09 |
| 2009/0033737 | A1 | 2/2009 | Goose et al. | |
| 2009/0089827 | A1 | 4/2009 | Carksgaard et al. | |
| 2009/0238378 | A1* | 9/2009 | Kikinis | H04N 13/0497 381/92 |
| 2011/0093273 | A1* | 4/2011 | Lee | G10L 15/24 704/270 |
| 2011/0238757 | A1* | 9/2011 | Den Brinker | G06Q 10/00 709/204 |
| 2011/0261142 | A1* | 10/2011 | Shanmukhadas | H04N 7/15 348/14.1 |
| 2011/0288888 | A1* | 11/2011 | Gazula | G06Q 10/10 705/3 |
| 2012/0081503 | A1* | 4/2012 | Leow | H04N 7/142 348/14.07 |
| 2012/0182384 | A1* | 7/2012 | Anderson | H04L 12/1827 348/14.09 |
| 2012/0200743 | A1* | 8/2012 | Blanchflower | H04N 21/254 348/239 |
| 2012/0274730 | A1* | 11/2012 | Shanmukhadas | H04N 7/147 348/14.08 |
| 2012/0281059 | A1* | 11/2012 | Chou | H04N 7/15 348/14.07 |
| 2012/0300014 | A1 | 11/2012 | Krantz | |
| 2013/0057639 | A1* | 3/2013 | Ralston | H04L 12/1827 348/14.02 |
| 2013/0265382 | A1* | 10/2013 | Guleryuz | G06T 11/60 348/14.08 |
| 2013/0278706 | A1* | 10/2013 | Connelly | H04N 21/4316 348/14.01 |
| 2013/0332832 | A1* | 12/2013 | Lin | H04N 21/4788 715/719 |
| 2014/0002583 | A1* | 1/2014 | Aoyagi | H04N 7/15 348/14.08 |
| 2014/0078246 | A1* | 3/2014 | Carpenter | H04N 7/148 348/14.13 |
| 2014/0139609 | A1* | 5/2014 | Lu | H04N 7/15 348/14.03 |
| 2014/0139613 | A1* | 5/2014 | Anderson | H04N 21/234345 348/14.08 |
| 2014/0342795 | A1* | 11/2014 | Zalcman | G07F 17/329 463/17 |
| 2014/0375886 | A1* | 12/2014 | Galleguillos | G06F 17/30793 348/571 |
| 2016/0150187 | A1* | 5/2016 | Fadili | H04N 7/15 348/14.08 |
| 2016/0191852 | A1* | 6/2016 | Abou-Chakra | H04L 12/1822 348/14.09 |

\* cited by examiner

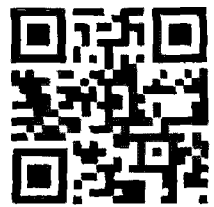
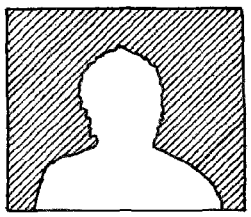
FIG.4A          FIG.4B
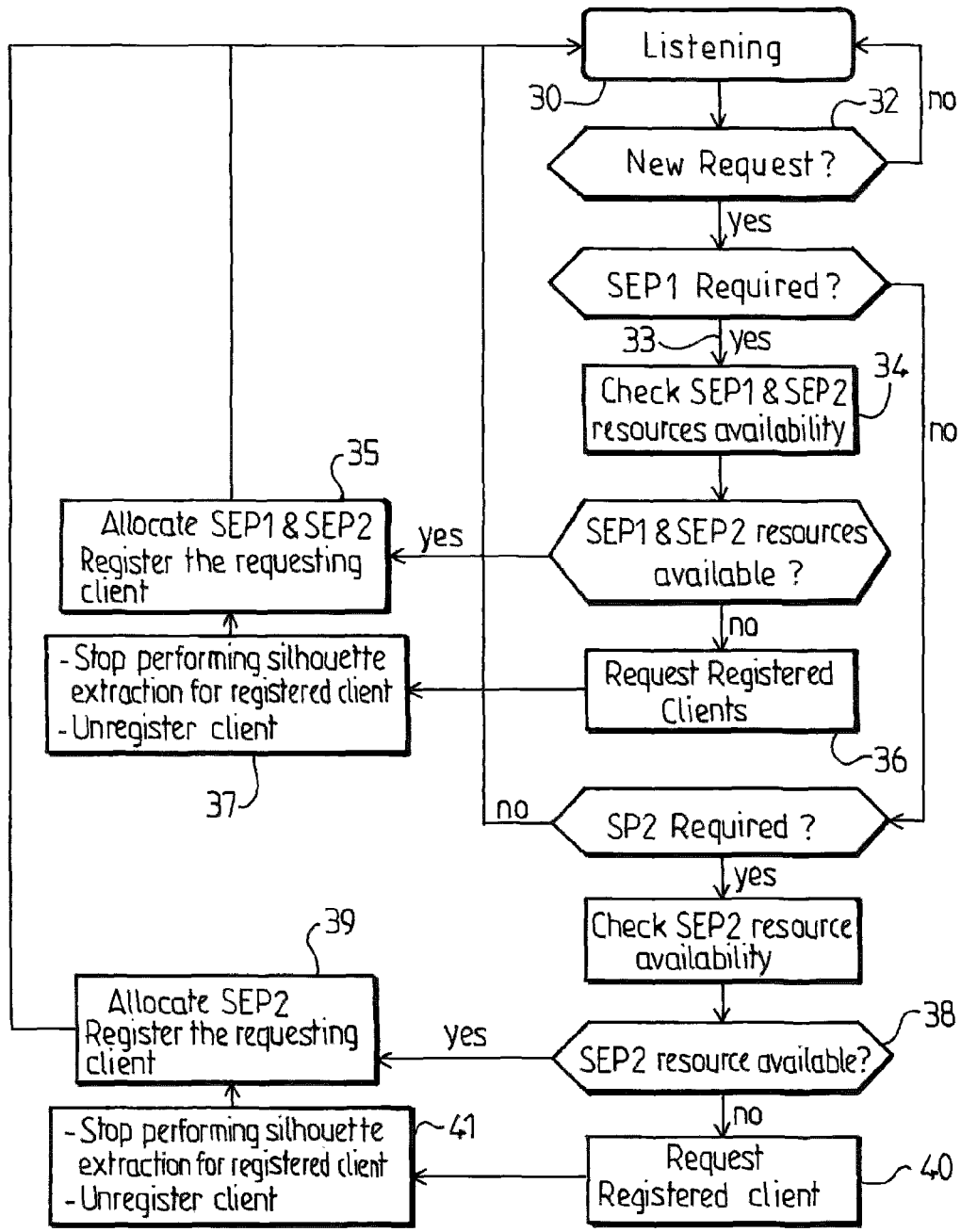
FIG.6

METHOD FOR GENERATING AN IMMERSIVE VIDEO OF A PLURALITY OF PERSONS

FIELD OF THE INVENTION

The invention relates to a method of video processing in a multi-participant video-conferencing system.

BACKGROUND

Along with the increase of bandwidth capabilities in communication systems, video communication systems have become increasingly popular in both business and residential applications. Indeed, in the case of geographically distributed team collaboration, these systems avoid the travelling of the team collaborators and increase flexibility.

Videoconferencing technologies use video and audio communication to allow a plurality of people to communicate at a same time, for instance for meeting activities. Furthermore, besides the audio and visual transmission of meeting activities, videoconferencing technologies can be used to share documents and display information.

Each participant in a videoconference is filmed by a camera which generates a video stream representing the participant in his/her own environment. To create an immersive video conference, the silhouette of each participant is extracted from corresponding video stream and all extracted silhouettes are displayed in a virtual conference environment, e.g. grouped around a virtual table. Such a virtual conference environment is a virtual background to simulate a meeting in a common virtual space, shared between all the participants, or to replace the actual background of a participant with another background such as a marketing banner.

One example of a system based on this principle is presented in "An immersive 3D video-conferencing system using shared virtual team user environment" by P. Kauf and O. Schreer in Proc. Of the 4th International Conference on Collaborative Environments, pp.105-112, 2002. This 3D video conference provides a representation of participants in a shared virtual meeting environment and relies on a multiple video capture of each participant of the video conference.

SUMMARY

In an embodiment, the invention provides a method for generating an immersive video of a plurality of persons in a computer server, the method comprising:
  receiving a plurality of video streams on a plurality of video channels from a plurality of client devices, each video stream including a silhouette of a person;
  extracting the person's silhouette from each incoming video stream to generate a filtered video stream representing only the silhouette of the person;
  generating a video stream of a virtual scene comprising a plurality of the silhouettes extracted from the plurality of filtered video streams the method further comprising receiving silhouette data carried on a metadata channel from a client device in addition to the video stream, the silhouette data representing a position of a face of the person within a frame of the video stream;
  analyzing the silhouette data;
  performing the silhouette extraction as a function of the silhouette data analyzed.

According to embodiments, such method may comprise one or more of the features below.

In an embodiment of the method, the silhouette data carried on the metadata channel is selected in the group consisting of coarse silhouette information representing coordinates of a characteristic point of the face of the person and fine silhouette information representing a mask corresponding to the person's silhouette.

In an embodiment of the method, the coarse silhouette information comprises coordinates of a face center, a height and a width of the face.

In an embodiment of the method, the received silhouette data comprises coarse silhouette information, the method further comprising transmitting the coarse silhouette information to a silhouette extraction processing block which computes the filtered video stream of the silhouette as function of the coarse silhouette information and the incoming video stream.

In an embodiment of the method, the silhouette extraction processing block applies a prediction algorithm to perform the silhouette extraction according to coarse silhouette information.

In an embodiment of the method, the received silhouette data comprises the fine silhouette information representing the mask, the method further including comparing the fine silhouette information to a threshold to detect the mask and applying the mask to the corresponding frame of the incoming video stream to obtain the filtered video stream representing only the silhouette of the person.

In an embodiment of the method, the fine silhouette information is a picture composed from pixels of a first color, for instance white pixels, and/or pixels of a second color, for instance black pixels.

In embodiment of the method, the method further includes
  comparing a value for each pixel in the picture to a mean value;
  attributing a standard value to each pixel as a function of a result of the comparison, wherein the standard value is a first standard value attributed if the pixel value is lower than the mean value and a second standard value attributed if the pixel value is higher than the mean value.

In an embodiment of the method, the method further includes:
  listening for CPU allocation requests from the client devices, wherein a CPU allocation request defines a type of the silhouette data to be sent by the client device;
  determining an available CPU capacity of the computer server in order to reply to the requesting client device according to the CPU load.

In an embodiment of the method, the method further includes accepting the allocation request from the first client device, allocating CPU capacity to the first client device and registering an ID of the first client device.

In an embodiment of the method, the method further includes:
  sending a message to the first client device to ask if the first client device has CPU capacity to generate fine silhouette information;
  unregistering said registered first client device in response to receiving a positive reply from the first client device;
  allocating CPU capacity freed from the first client device to perform the silhouette extraction for a requesting second client device;
  Registering the requesting second client device.

In embodiments of the method, the method further includes:
  sending a message to the first client device to ask if the first client device has CPU capacity to generate coarse silhouette information;
  disconnecting the extraction of coarse information for the first client device in response to receiving a positive reply from the first client device;
  allocating CPU capacity freed from the first client device to perform the silhouette extraction for a requesting second client device;
  Registering the requesting second client device.

The invention also provides a method of generating a video stream in a client device including:
  capturing a video stream from a capture device;
  performing a silhouette extraction process from the captured video stream to generate silhouette data;
  encoding the silhouette data generated by the silhouette extraction process;
  sending the video stream in a four channels video format including three channels of raw video data using a color space for the video stream and one metadata channel for the silhouette data generated by the silhouette extraction process.

In an embodiment of the method of generating a video stream in a client device, the silhouette extraction process generates fine silhouette information representing a mask corresponding to the person's silhouette within a frame of the video stream.

In embodiment of the method of generating a video stream in a client device, the metadata channel is selected in the group consisting of an alpha channel, a RTP extension channel and a RTP channel.

In an embodiment, the invention also provides a video conference server comprising:
  a video decoder block able to receive video streams from a plurality of client devices,
  a user processing detection block able to detect a metadata channel in an incoming video stream;
  a first silhouette extraction sub-processing block able to perform a silhouette extraction process in the incoming video stream to generate coarse silhouette information;
  a second silhouette extraction sub-processing block able to perform a silhouette extraction process to generate fine silhouette information as a function of the coarse silhouette information and the incoming video stream;
  a immersive rendering block able to mix a plurality of silhouette video streams to generate a virtual scene, and
  a video encoder block able to encode and send a video stream comprising the virtual scene to a client device.

In other embodiments, the video processing server further includes a Resource manager module including
  a listener module adapted to listen for CPU request for extraction step,
  a CPU capacity determination module able to determine a CPU capacity available in the video processing server;
  a communication module able to send messages to registered client devices for which the video processing server performs silhouette extraction, and
  a memory able to register a client device.

In an embodiment, the invention also provides a computer program comprising computer-executable instructions that perform the above-mentioned method when executed, and a computer that comprises said computer program.

The invention originates from the observation that the use of a dedicated server to extract participant's silhouette in each video stream requires a very high resource capacity in the server and, consequently, a very important cost server for video processing. Moreover, the silhouette extraction may be performed by the dedicated server to a different extend as a function of whether the client device is powerful enough to do some part of or all of the silhouette extraction by itself. An idea on which the invention in based is to take advantage of the client device abilities and to distribute the video processing tasks between the server and the client devices. Advantageously, such a distribution of the video processing could be dynamic, according to the respective context and usage of the server and of each client device. Such a dynamic allocation offers an optimal distribution of the tasks between the server and client resources.

Other aspects of the invention are based on the idea of splitting into several sub tasks of processing the silhouette extraction, resulting in an easier more flexible possibility of repartition of the sub tasks.

BRIEF DESCRIPTION OF THE DRAWINGS

These and other aspects of the invention will be apparent from and elucidated with reference to the embodiments described hereinafter, by way of example, with reference to the drawings.

FIG. 4A illustrates an example of encoded coarse silhouette information;

FIG. 4B illustrates an example of fine silhouette information;

FIG. 6 is a diagram representing the operations performed by the Request Manager in the Video Processing Server of FIG. 5.

DETAILED DESCRIPTION OF THE EMBODIMENTS

An immersive video conference requires signal processing for performing the silhouette extraction from the captured video stream background and the silhouettes rendering with a virtual background in the virtual scene.

A silhouette extraction consists in analyzing each frame of a video stream so as to perform a foreground and background segmentation. In other words, the silhouette extraction consists in extracting the shape of the participant as a silhouette from the frames captured by the corresponding video camera and removing the background of the frame. Silhouette extraction can be performed by hardware processing or by a software processing.

Hardware silhouette extraction processing, hereafter named HSEP, is performed for instance by a stereoscopic camera. In stereoscopic cams, two video streams are available. These two streams can be used to estimate the depth in the captured scene. A 3D location estimation of each pixel is generated and the silhouette is then extracted. In an embodiment, a camera is equipped with depth estimation capabilities. In this embodiment, the depth estimation is used for silhouette extraction.

Software silhouette extraction processing, hereafter named SSEP, is performed by software or algorithms. A first silhouette extraction processing, hereafter named SEP1, consists in analyzing each video frame to detect and track face location and basic face geometry (face height and width, orientation). A combination of pure face detection and shoulder detection is used for face localization and a Kelman algorithm is used for face movement tracking. Face position and geometry for each frame of a video stream are used in a prediction algorithm to generate coarse silhouette information of which an example is described in FIG. 4A.

A second main silhouette extraction processing, hereafter named SEP2, uses the coarse silhouette information generated by SEP1 to compute face based probability of the silhouette. During SEP2, gradients are computed for each color component to detect contours. An estimation of object motions is done to compute Motion based probability and a belief propagation algorithm is applied to Face/Motion probabilities and gradients to converge to the actual contours of the silhouette corresponding to fine silhouette information representing a mask, of which an example is described in FIG. 4B.

Figure 1:
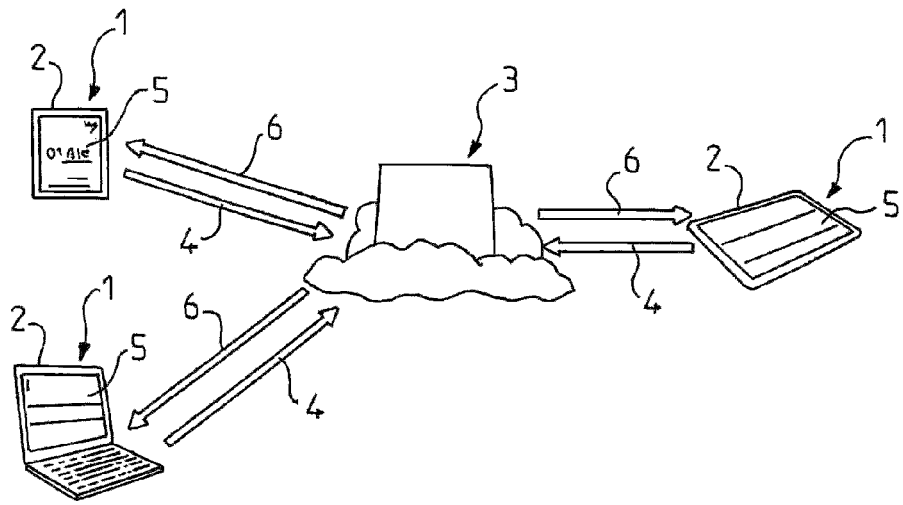
FIG. 1 illustrates a first embodiment of a video conferencing system architecture in the case wherein three attendees are participating to a videoconference, each attendee having a personal client device connected to a video conferencing server.

FIG. 1 illustrates a general video conferencing system architecture in the case wherein three participants $P_1$, $P_2$ and $P_3$ are participating to a videoconference.

Each attendee $P_1$, $P_2$ and $P_3$ has his/her own client device 1 which may be for instance a personal computer, a mobile phone, a tablet or any other device having a capture device 2, a communication device and a display device. The three participants, and their respective client devices, are located in different places. Each client device 1 is connected to a central server 3.

Each client device 1 has a capture device 2 which captures digital video frames of its corresponding participant in his environment. The digital video frames captured by each client device 1 are encoded in a video stream. Encoded video stream 4 is then transmitted to the central server 3. The central server 3 mixes the received video frames from each participant to generate a plurality of virtual scenes 5. Each generated virtual scene 5 is sent by the central server 3 to a specific client device 1 which display the received virtual scene 5 on its display device. Such a virtual scene 5 represents the other participants in a virtual common background. As an example, a participant $P_2$ receives a videoconference stream 6 including a virtual scene 5 wherein the participants $P_1$ and $P_3$ are present.

Figure 2:
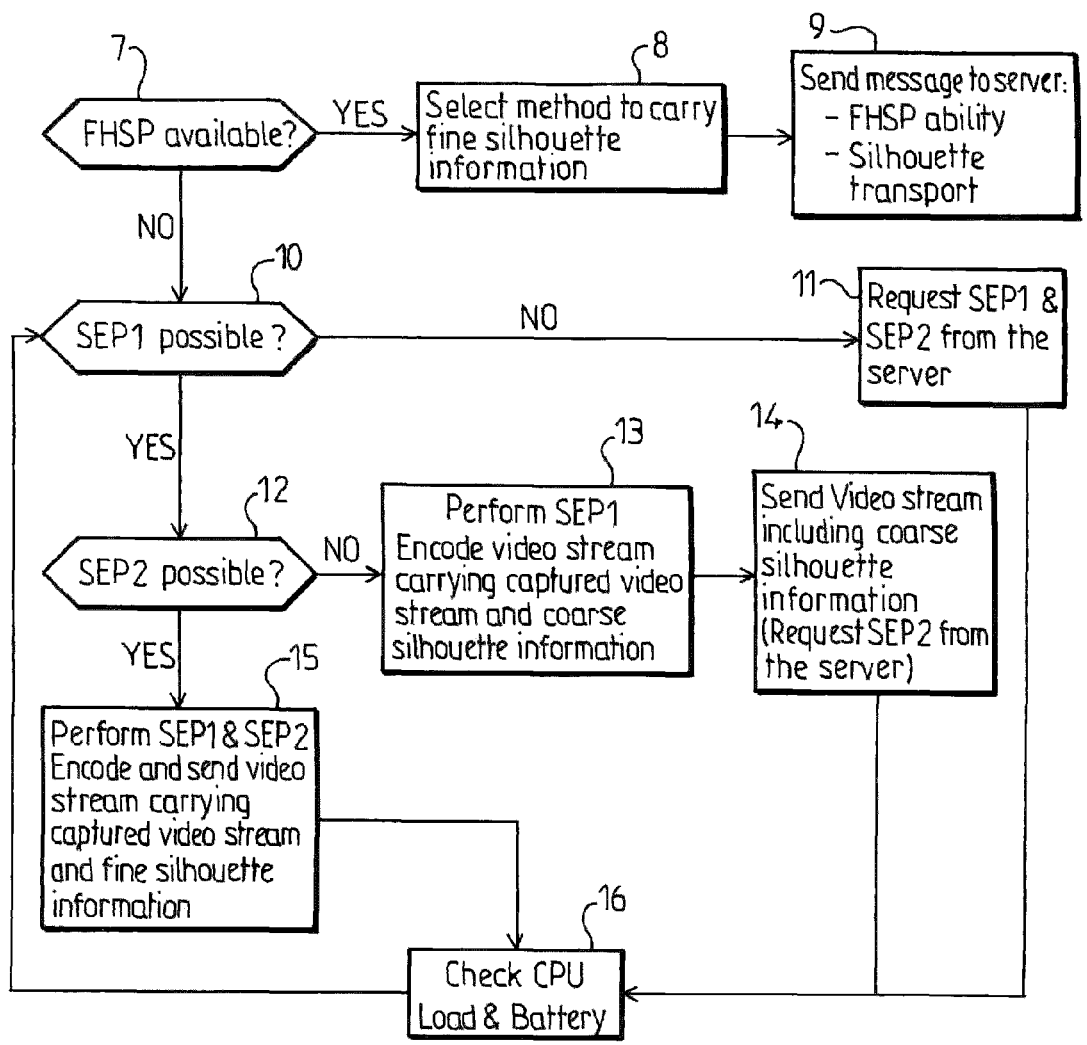
FIG. 2 is a diagram representing the client operations during a video conference in the system of FIG. 1.

FIGS. 2 is a diagram representing the client device operations during a video conference in the system of FIG. 1.

Each client device 1 may have different capacities. A client device 1 has to detect if it is able to perform, at least partially, a silhouette extraction process. The tests to detect the client device capacity are mainly tests concerning the hardware capacities and the CPU capacity to detect if the client device 1 is able to perform a HSEP or if its CPU has the capacity to perform a SSEP. According to its silhouette extraction capacity, the client device 1 performs the silhouette extraction. A method to carry the video stream is selected as a function of the silhouette extraction capacity. The client device 1 transmits to the central server 3 the encoded video stream 4 according to the selected method.

Silhouette data can be carried by many means, for instance some video codecs allow the use of an alpha channel. The alpha channel, which is conventionally used as an opacity channel, can be used as additional gray image to carry silhouette data. The analysis of the alpha channel by the central server 3 will allow detecting the silhouette data and determining if and what has already been performed in terms of silhouette extraction processing.

In an embodiment, the silhouette data is carried by a RTP extension mechanism. Another RTP separate stream may also be used to carry silhouette data. The RTP extension payload or an RTP separate stream contains one channel video stream which carries silhouette data.

In a HSEP capacity detection step 7, the client device 1 detects if the capture device 2 is able to perform a full HSEP.

If the capture device 2 can perform the full HSEP, the HSEP is performed by the capture device 2 and the client device 1 selects 8 a method to carry the fine silhouette information generated by HSEP. Client device 1 encodes a video stream including the captured video stream and fine silhouette data generated by HSEP as function of the selected carrying method. Then, in a full HSEP data transmitting step 9, the client device 1 sends the encoded video stream 4 to the central server 3. In a embodiment, the message may include information about the full HSEP capacity to the central server 3.

If the capture device 2 is unable to perform a full HSEP, the client device 1 performs a SEP1 capacity step 10 to detect if the CPU integrated in the client device 1 is powerful enough to perform SEP1.

If the client device 1 is unable to perform SEP1, said client device 1 encodes the video stream captured by its capture device 2 and transmits 11 encoded video stream 4 to the central server 3. Such an encoded video stream 4, including only the captured video stream, is interpreted by the central server 3 as a request to perform the silhouette extraction SEP1 and SEP2.

If the client device 1 is powerful enough to perform SEP1, the client device 1 performs a SEP2 capacity step 12 to detect if the client device 1 is able to perform SEP2.

If the client device 1 is unable to perform SEP2, the client device 1 performs SEP1 which generate coarse silhouette information (step 13). The client device 1 encodes the generated coarse information and the video stream captured by its capture device 2 as function of a selected method to carry said coarse silhouette information and captured video stream. The client device 1 then sends (step 14) the encoded video stream 4 to the central server 3 in a transmission of coarse information step. The video stream carrying coarse information is interpreted by the central server 3 as a request from client device 1 for performing SEP2.

If the client device 1 is powerful enough to perform both SEP1 and SEP2, which means that the client device 1 is powerful enough to perform full SSEP, the client device 1 performs SEP1 and SEP2. The client device 1 encodes a video stream carrying the fine silhouette information and the video stream captured by its capture device 2. The client device then sends (step 15) the encoded video stream to the central server 3 which detects the fine silhouette information and can directly use said fine silhouette information without performing neither SEP1 nor SEP2.

As will be explain thereafter, the CPU load and battery may evolve during the immersive video conference. Such an evolution induces a variation in time of the client device 1 capacity to perform SSEP. Therefore, if the client device 1 has no HSEP capacity, the client device 1 has always to check (step 16) its CPU load and battery. After checking CPU load and battery, the client device 1 re-executes the various steps to detect its SSEP capacity and send corresponding encoded video stream to the central server 3.

Figure 3:
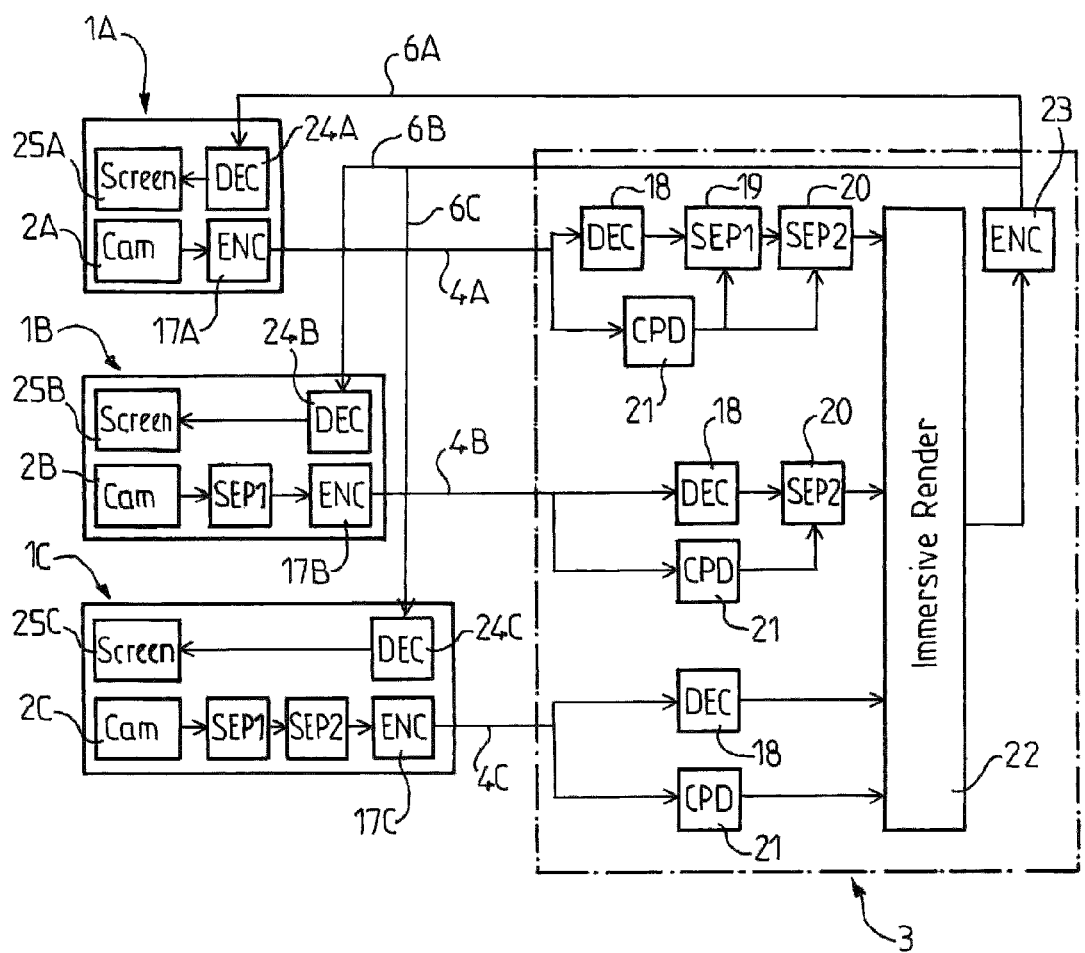
FIG. 3 is a schematic representation of the main functional blocks composing the video conferencing server and each client device in the system of FIG. 1 for generating an immersive video conference.

The FIG. 3 is a schematic representation of the main functional blocks composing the video conferencing server and each client device shown in FIG. 1.

In FIG. 3, the video processing for immersive video conferencing is shared between client devices 1 and the central server 3. As the client devices 1 have different capacities, the video streams received by the central server 3 are subject to various encoding processes. Indeed, the client devices 1 capacity notably depends on the CPU power and the capturing device hardware. If a client device 1 has a full HSEP or SSEP capacity, the silhouette extraction will be performed mostly by the client and the client device 1 will transmit to the server an encoded video stream 4 including the captured video stream and fine silhouette information. If a client device 1 does not have a full HSEP or full SSEP capacity but does have the capacity to perform SEP1, the encoded video 4 stream transmitted by the client device 1 will include the capture video stream and coarse silhouette information. If the client device does not have the capacity to perform full HSEP or full SSEP neither to perform SEP1, the encoded video stream 4 transmitted to the central server 3 just includes the video stream captured by the capture device 2. In all cases, the encoded video stream 4 transmitted to the central server 3 is encoded in an encoder block 17 and then sent to the central server 3.

The central server 3 comprises a decoder block 18 able to decode an encoded video stream 4. The central server 3 further includes a first silhouette extraction sub-processing block 19 able to perform SEP1 and a second silhouette extraction sub-processing block 20 able to perform SEP2. The central server 3 also includes a Client Processing Detection block 21, hereafter named CPD.

When received by the central server 3, an encoded video stream 4 is transmitted both to the decoder block 18 and to the CPD. The CPD analyzes the encoded video stream 4 to detect a silhouette metadata channel. If a silhouette metadata channel is detected, the CPD extracts the silhouette data carried on the silhouette metadata channel to analyze it and detect which steps of the silhouette extraction process have been already performed. The CPD then transmits to the decoder block 18 instructions corresponding to the destination to which the decoder block 18 has to send the decoded video stream (first silhouette extraction sub-processing block 19, second silhouette extraction sub-processing block 20 or an immersive render block 22) and the central server 3 performs the remaining steps of the silhouette extraction process. The immersive render block 22 receives all the silhouette images extracted from the plurality of encoded video stream 4 and mixes the extracted silhouettes to generate the virtual scene 5 for each participant. Each virtual scene 5 is then encoded by an encoder block 23 and transmitted to the desired client devices 1. When received by the client devices 1, the virtual scenes 5 are decoded by a client decoder block 24 and displayed on a screen 25.

In the example represented in FIG. 3, a participant PA has a smartphone 1A as client device, a participant PB has a tablet 1B as client device and a participant PC has a personal computer 1C as client device.

The smartphone 1A comprise a basic camera 2A. This basic camera 2A generates only one video stream and the silhouette extraction has to be performed by the application of SSEP. However, the CPU integrated to the smartphone 1A is not powerful enough to perform SEP1 neither SEP2.

As client device 1A has no SSEP capacity, the video stream captured by the basic camera 2A is directly encoded in the encoder block 6A of client device without any silhouette data. Such an encoded video stream is a three channel video stream, for instance in a RGB or a YUV color space. The encoded video stream 4A is then transmitted to the central server 3.

When received by the central server 3, the encoded video stream 4A is transmitted to the decoder block 18 and to the CPD. The CPD analyzes the encoded video stream 4A and does not detect any silhouette data channel. As no silhouette data channel is detected, the CPD determines that no silhouette data is available and no silhouette extraction process has been performed by the client device 1A. Then, the CPD sends instructions to the decoder block 18 to send the decoded video stream to the first silhouette extraction sub-processing block 19. First silhouette extraction sub-processing block 19 performs SEP1 and transmits the generated coarse silhouette information to the second silhouette extraction sub-processing block 20. Second silhouette extraction sub-processing block 20 performs SEP2 and then transmits the fine silhouette information to the immersive render block 22 which generates the virtual scenes 5.

The tablet 1B comprises a basic camera 2B, without any HSEP capacity. However, the CPU integrated to the tablet is powerful enough to perform a SSEP, and more precisely to perform SEP1.

As client device 1B has a basic camera 2B which cannot perform a HSEP but has a CPU which allows performing SEP1, the encoder block 17B of tablet 1B encodes the video stream captured by the camera 2B and the coarse silhouette information generated by SEP1. The encoded video stream 4B is a four channels video stream, three channels carrying the captured video stream in a RGB or a YUV color space and a silhouette metadata channel carrying the coarse silhouette information. The tablet 1B transmits the encoded video stream 4B to the central server 3

When the central server 3 receives the encoded video stream 4B, the encoded video stream 4B is transmitted to the CPD and to the decoder block 18. The CPD detects the silhouette data channel and extracts the data carried on said silhouette data channel. The CPD analyzes the extracted data and detect coarse silhouette information. As coarse silhouette information have been detected, the CPD send to the decoder block 18 instructions to decode the encoded video stream 4B and transmit the decoded video stream to the second extraction silhouette sub-processing block 20 and the CPD transmits the extracted coarse information to the second silhouette extraction sub-processing block 9. The second extraction silhouette sub-processing block 20 performs SEP2 as function of received decoded video stream and coarse silhouette information to generate fine silhouette information. Then the second extraction silhouette sub-processing block 20 transmits the generated fine silhouette information to the immersive render block 22 which generates the virtual scenes 5.

The personal computer 1C is able to perform full silhouette extraction process, client device 1C having for instance a stereoscopic camera 2C able to perform HSEP and/or a CPU capacity able to perform a full SSEP, typically both SEP and SEP2. Therefore, the video stream 4C encoded by the encoder block 17C of the personal computer 1C includes the captured video stream and the fine silhouette information. The encoded video 4C stream is a four channels video stream, three channels carrying the captured video stream in a RGB or a YUV color space and a silhouette metadata channel carrying the fine silhouette information. The encoded video 4C stream is transmitted to the central server 3.

The encoded video stream 4C is transmitted to the CPD and to the decoder block 18. The CPD detects the silhouette metadata channel and extracts the silhouette data carried on said silhouette data channel. CPD then analyses the extracted data to detect if extracted data represent coarse silhouette information. As encoded video stream 4C does not include coarse data, the extracted data are then analyzed to detect if extracted data includes fine silhouette information. If fine silhouette information is detected by the CPD, the CPD sends to the decoder block 18 an instruction to transmit the decoded video stream directly to the immersive render block 22 and the CPD transmits the extracted fine silhouette information to the immersive render block 22. The immersive render block 22 then generates the virtual scenes 5.

If neither coarse silhouette information nor fine silhouette information is detected by the CPD, CPD concludes that despite there is a silhouette metadata channel carrying data, such data carried by the silhouette metadata channel is not silhouette data and no extraction process have been performed by the client device 1. The central server 3 then acts as if there were no silhouette metadata channel and performs the full silhouette extraction process.

FIG. 4A illustrates an example of encoded coarse silhouette information.

Coarse silhouette information is the result of face detection and tracking with basic geometry information as described above. Typically, coarse silhouette information comprises coordinates of a characteristic point of the face of the participant. Coordinates are, for instance, a column position and a line position in a frame. In addition, the coarse information may include the dimensions of the face of a participant, e.g a face width and a face height. In FIG. 4A, the coarse silhouette information is encoded using an image processing QR code, the coordinates being encoded as a matrix barcode.

FIG. 4B illustrates an example of fine silhouette information.

The fine silhouette represents, for each frame of the captured video stream, a mask. Such a mask is a picture to be applied to the corresponding frame of the captured video stream to extract the background of the frame and keep only the silhouette of the person. A mask is, for instance, a picture in which for each pixel belonging to silhouette, the pixel is white and its value is 255, and for each pixel belonging to background, the pixel is black and its value is 0.

When the CPD analyzes silhouette data carried on a silhouette metadata channel, if it does not detect coarse silhouette information, the CPD analyzes the silhouette data to detect if extracted silhouette information is a mask. If the extracted picture is a mask, each pixel should have a value around 0 or around 255. To compensate for the compression noise a first threshold TH1 is used. The value of each pixel is compared to (0+TH1) and (255−TH1) with for instance TH1=25. If the value of the pixel is less than (0+TH1), the value of said pixel is replaced by 0. If the value of the pixel is higher than (255−TH1), the value of said pixel is replaced by 255.

A second threshold TH2 is a percentage corresponding to the number of pixels of a picture needed to have a value of 0 or 255 to consider the picture as mask. For instance, TH2 is 90%. The number of pixels having the value of 0 or 255, after the noise compensation step, is computed. If this number of pixels having a value of 0 or 255 is higher than TH2 multiplied by the total number of pixels of the picture, then the image is assumed to be a mask computed by the client device, else the CPD assumes that the extracted picture is not a valid mask.

If the extracted picture is detected as a mask, each pixel is compared to the mean value. If the pixel value is lower than the mean value, this pixel belongs to the background, else the pixel belongs to silhouette.

If the data carried on the silhouette metadata channel is not a coarse silhouette information neither a mask, the CPD assumes that no Silhouette extraction processing has been performed by the client device.

The above described system enables to obtain an economical immersive video conference. Indeed, the fact that the video processing for immersive video conferencing is shared between client devices and the central server allows optimization of the CPU load of the central server. Furthermore, this system takes advantage of the presence of more powerful client devices and may benefit from the silhouette extraction capability embedded in capture devices.

The method is very flexible and may be used by a participant in different places when moving as it does not need a complex room setup, multiple video captures or large displays.

Furthermore, any user with a network device and camera-enabled device can participate to the videoconference without any additional specific software or hardware modules.

Figure 5:
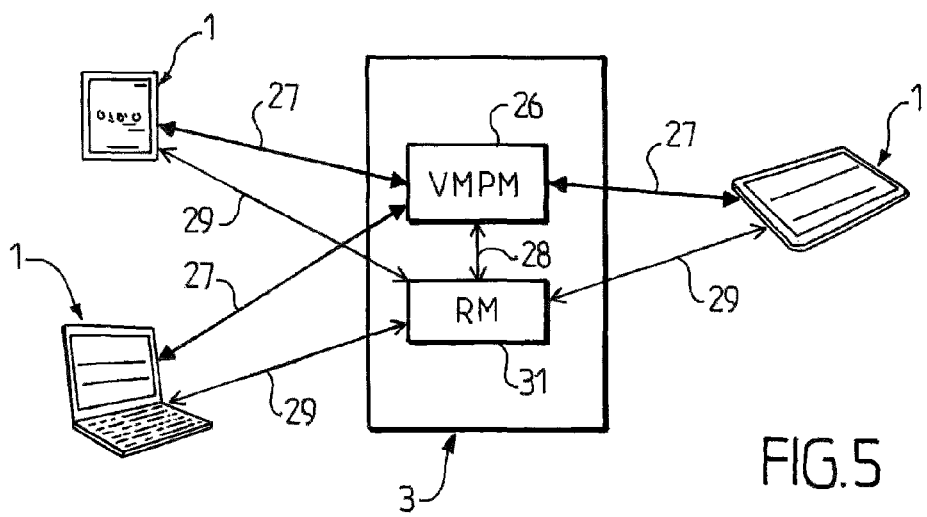
FIG. 5 illustrates a second embodiment of a video conferencing system architecture including a Video Processing Server comprising a Request Manager module.

FIG. 5 illustrates a second embodiment of a video conferencing system architecture including a Video Processing Server comprising a Request Manager module.

In this embodiment, the central server includes a video mixing and processing 26, hereafter named, VMPM module and resource manager 31.

The VMPM includes mainly the same components as the components described in the central server 3 of FIG. 2. The VMPM includes a video decoding block, a user processing detection block, a first silhouette extraction sub-processing block and a second silhouette extraction sub-processing block, an immersive render block and a video encoder block. The VMPM receives encoded video streams from the client devices, with or without silhouette data. The VMPM generates and send 27 virtual scenes to each client device as a function of received encoded video streams 4.

The resource manager communicates 28 with the VMPM to check the actual available video processing resources in the central server 3. Control links 29 are used for information exchanges between client devices 1 and resource manager 31 for a dynamic resource optimization. Such exchanges between client devices and resource manager 31 are done for instance by web service, RTCP-X or any other mean known from the person skilled in the art.

FIG. 6 is a diagram representing the operations performed by the Request Manager in the Video Processing Server of FIG. 5.

To ensure a dynamic resource optimization, the resource manager 31 is always listening (step 30) for client devices 1 request. A client device 1 can request for performing full or partial silhouette extraction process from the central server 3. Such a request is transmitted from the client device 1 to the resource manager 31 via the control link 29.

If the resource manager 31 receives (step 32) a new request, the request is analyzed to detect which parts of the silhouette extraction process is required by the client device 1. Typically, the client device can request from the server to perform SEP1 and SEP2 or only SEP2.

If SEP1 is required (step 33), it means that the client device 1 is requesting for a full silhouette extraction process (SEP1 and SEP2). The resource manager 31 then communicates with the VMPM to check (step 34) the CPU available resources of the central server 3.

If resources to process silhouette extraction are available in the central server 3, the resource manager 31 allocates (step 35) said resources from the central server 3 to perform SEP1 and SEP2 for the requesting client device 1. As the resource manager 31 is allocating central server 3 resources, resource manager 31 registers the requesting client device 1 with a dedicated ID in a database. Such a registration is useful to keep a list of client devices for which the central server 3 is performing a silhouette extraction process.

If central server 3 has not enough available resources to perform the requested silhouette extraction process, the resource manager 31 sends (step 36) a message to the registered client devices 1 in the database. The message sent by the resource manager 31 asks to the registered client devices 1 their actual resources capacity. Typically, the resource manager 31 asks to a register client device 1 if said registered client device has enough available resources to perform itself the silhouette extraction process done by the central server 3.

If registered client device 1 has available resources to perform itself the silhouette extraction process done by the central server 3, then the central server 3 stops to perform the silhouette extraction process for said registered client device 1 and unregisters the corresponding client device 1 (step 37). The resources to perform the silhouette extraction process for the requesting client device, which have been freed by the unregistered client device 1, are then allocated to the requesting client device 1 to perform SEP1 and SEP2 as requested.

If the request received by the resource manager is not requesting SEP1, then only SEP2 is requested.

As for SEP1, the resource manager checks (step 38) for the available resources in the central server 3. If the resources to perform SEP2 are available in the central server 3, said resources are allocated to perform requested SEP2 and the requesting client device 1 is registered in the client devices 1 database (step 39).

If the resources to perform requested SEP2 silhouette extraction are not available in the central server 3, then the resource manager send (step 40) a message to the registered client devices 1 to ask them if they have resources capacity to perform by themselves the silhouette extraction process done by the central server 3. If a registered client device 1 has resources capacity to perform by itself the silhouette extraction process performed by the central server 3, the central server 3 stops to perform said silhouette extraction process and unregisters the corresponding client device 1 (step 41). The central server 3 resources freed by the unregistered client device 1 are allocated to perform requested SEP2 of the requesting client device 1 and said requesting client device 1 is registered in the client device 1 database.

The invention is not limited to the described embodiments. The appended claims are to be construed as embodying all modification and alternative constructions that may be occurred to one skilled in the art, which fairly fall within the basic teaching here, set forth. The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps. The invention may be implemented by means of hardware as well as software. The same item of hardware may represent several "means".

For instance, SSEP may be performed by several different algorithms such as movement detection algorithms, contour detection algorithms, face detection algorithms or morphologic statistical models, during several frames. The result provided by these algorithms is the silhouette of the attendees in the captured video stream during the succession of frames. The SEP1 and SEP2 steps described here above could be done in any different manner known from the person skilled in the art.

The HSEP may be fulfilled using all kind of hardware capacity as furnished by a stereoscopic video capture or a camera with depth estimation.

The resource manager could allocate the available resources of the central server to perform silhouette extraction according to any condition, for instance according to priority given to different client devices or according an order defined before the beginning of the video conference or any other method known from the person skilled in the art. Moreover, the resource manager could do not send a request to know if the registered client device has capacity to perform silhouette extraction process, resource manager freeing the allocated resources to registered client and sending to said registered client that the central server has no more capacity to perform its silhouette extraction process before unregister said client device.

It is understood that the extraction process could be done partially by a hardware silhouette extraction process which generates coarse silhouette information and completed by a software silhouette extraction process which generates fine silhouette information. In this case, a camera performs for instance SEP1 and client device or central server performs SEP2.

In the claims, any reference signs placed between parentheses shall not be construed as limiting the scope of the claims.

The invention claimed is:

1. A method for generating an immersive video of a plurality of persons in a computer server, the method comprising:
   receiving a plurality of video streams on a plurality of video channels from a plurality of client devices, each video stream including a silhouette of a person;
   analyzing the video stream received from a client device to detect a silhouette metadata channel carrying silhouette data the silhouette data being selected from the group consisting of coarse silhouette information representing coordinates of a characteristic point of the face of the person and fine silhouette information representing a mask corresponding to the shape and location of the person within a frame of the video stream;
   analyzing the silhouette data when a silhouette metadata channel has been detected and;
   in the case that a silhouette metadata channel is detected, extracting the person's silhouette as a function of the silhouette data and generating a filtered video stream representing only the silhouette of the person;
   in the case that a silhouette metadata channel has not been detected, generating in the computer server silhouette data from the video stream received and extracting the person's silhouette from the incoming video stream as a function of the silhouette data generated; and
   generating a video stream of a virtual scene comprising a plurality of the silhouettes extracted from the plurality of filtered video streams.

2. The method according to claim 1, further including:
listening for CPU allocation requests from the client devices, wherein a CPU allocation request defines a type of the silhouette data to be sent by the client device; and
determining an available CPU capacity of the computer server in order to reply to a requesting first client device according to the CPU load.

3. The method according to claim 2, further including accepting the allocation request from the first client device, allocating CPU capacity to the first client device and registering an ID of the first client device.

4. The method according to claim 3 further including:
sending a message to the first client device to ask if the first client device has CPU capacity to generate fine silhouette information;
unregistering said registered first client device in response to receiving a positive reply from the first client device;
allocating CPU capacity freed from the first client device to perform the silhouette extraction for a requesting second client device; and
registering the requesting second client device.

5. The method according to claim 3 further including:
sending a message to the first client device to ask if the first client device has CPU capacity to generate coarse silhouette information;
discontinuing the extraction of coarse information for the first client device in response to receiving a positive reply from the first client device;
allocating CPU capacity freed from the first client device to perform the silhouette extraction for a requesting second client device; and
Registering the requesting second client device.

6. The method according to claim 1, wherein the coarse silhouette information comprises coordinates of a face center, a height and a width of the face.

7. The method according to claim 1, wherein the received silhouette data comprises coarse silhouette information, the method further comprising transmitting the coarse silhouette information to a silhouette extraction processing block which computes the filtered video stream of the silhouette as a function of the coarse silhouette information and the incoming video stream.

8. The method according to claim 7, wherein the silhouette extraction processing block applies a prediction algorithm to perform the silhouette extraction according to coarse silhouette information.

9. The method according to claim 1, wherein the received silhouette data comprises the fine silhouette information representing the mask, the method further including comparing the fine silhouette information to a threshold to detect the mask and applying the mask to the corresponding frame of the incoming video stream to obtain the filtered video stream representing only the silhouette of the person.

10. The method according to claim 9, wherein the fine silhouette information is a picture composed from pixels of a first color and/or pixels of a second color, the method further including:
comparing a value for each pixel in the picture to a mean value; and
attributing a standard value to each pixel as a function of a result of the comparison, wherein the standard value is a first standard value attributed if the pixel value is lower than the mean value and a second standard value attributed if the pixel value is higher than the mean value.

11. A method of generating a video stream in a client device including:
capturing a video stream from a capture device;
performing a silhouette extraction process from the captured video stream to generate silhouette data;
encoding the silhouette data generated by the silhouette extraction process; and
sending the video stream in a four channels video format including three channels of raw video data using a color space for the video stream and one metadata channel for the silhouette data generated by the silhouette extraction process.

12. The method according to claim 11, wherein the metadata channel is selected in the group consisting of an alpha channel, a RTP extension channel and a RTP channel.

13. A video processing Server including:
a video decoder block able to receive video streams from a plurality of client devices and to generate respective decoded video streams,
a client processing detection block able to detect a metadata channel in an incoming video stream;
a first silhouette extraction sub-processing block able to perform a silhouette extraction process in a respective decoded video stream to generate coarse silhouette information;
a second silhouette extraction sub-processing block able to perform a silhouette extraction process to generate fine silhouette information as a function of coarse silhouette information and the respective decoded video stream; and
an immersive rendering block able to use fine silhouette data to extract silhouette video streams of respective persons from respective video streams and mix a plurality of silhouette video streams to generate a virtual scene;
wherein the client processing detection block is able to transmit to the video decoder block instructions to send the decoded video stream:
to the first silhouette extraction sub-processing block when no metadata channel is detected or when the metadata channel does not contain any silhouette data,
to the second silhouette extraction sub-processing block when a metadata channel is detected and contains coarse silhouette information, the course silhouette information representing coordinates of a location of a person within a frame of the video stream; and
to the immersive rendering block when a metadata channel is detected and contains fine silhouette information representing a mask corresponding to the shape and location of the person within a frame of the video stream;
the video processing server further including:
a video encoder block able to encode and send a video stream comprising the virtual scene to a client device.

14. The Video processing server according to claim 13 further including a Resource manager module including:
a listener module adapted to listen for CPU request for extraction,
a CPU capacity determination module able to determine a CPU capacity available in the video processing server;
a communication module able to send messages to registered client devices for which the video processing server performs silhouette extraction, and
a memory able to register a client device.

15. A method for generating an immersive video in a computer server, the method comprising:
- receiving a video stream from a client device of an associated user;
- determining whether the video stream includes fine silhouette information representing a mask corresponding to the silhouette of the user suitable for identifying pixels in the video stream to be used in generation the immersive video, course silhouette information representing face detection of the user suitable for aiding the generation of fine silhouette information or no silhouette information describing a silhouette of the user;
- under the condition that the video stream includes fine silhouette information:
  - using the received fine silhouette information to select pixels in the video stream to be used in generating the immersive video;
- under the condition that the video stream includes coarse silhouette information:
  - processing the video stream guided by the coarse silhouette information to generate fine silhouette information;
- under the condition that the video stream includes no information describing a silhouette of the user:
  - processing the video stream to generate fine silhouette information;
- using the generated fine silhouette information to select pixels in the video stream to be used in generation of the immersive video; and
- generating a video stream of a virtual scene including representations based on the selected pixels.

* * * * *